Jan. 13, 1959  O. J. POUPITCH  2,868,486
SHEET METAL CLIP
Filed Oct. 12, 1954
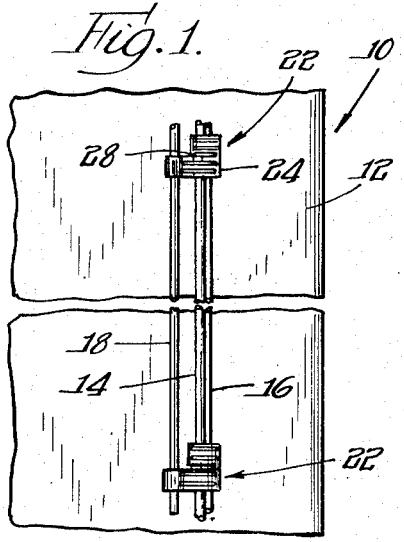
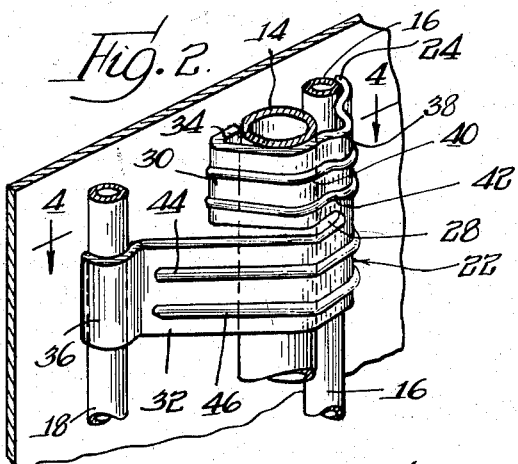
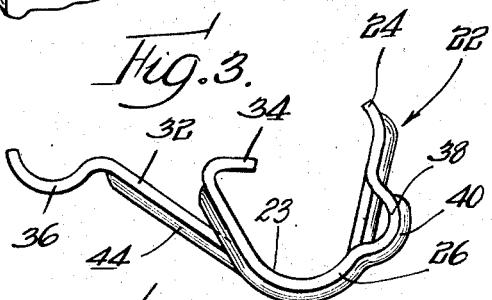
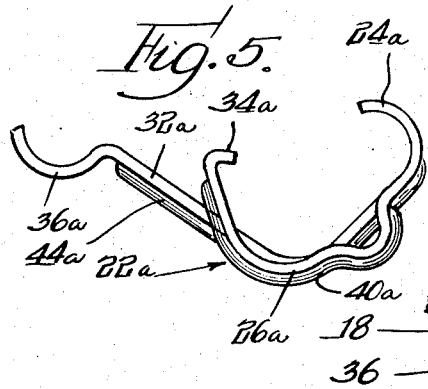
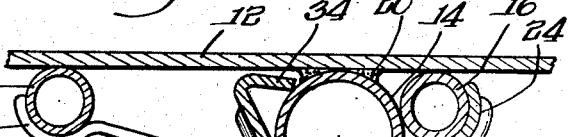
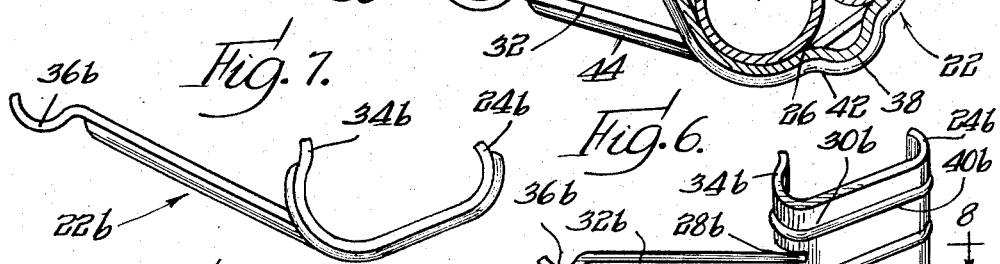
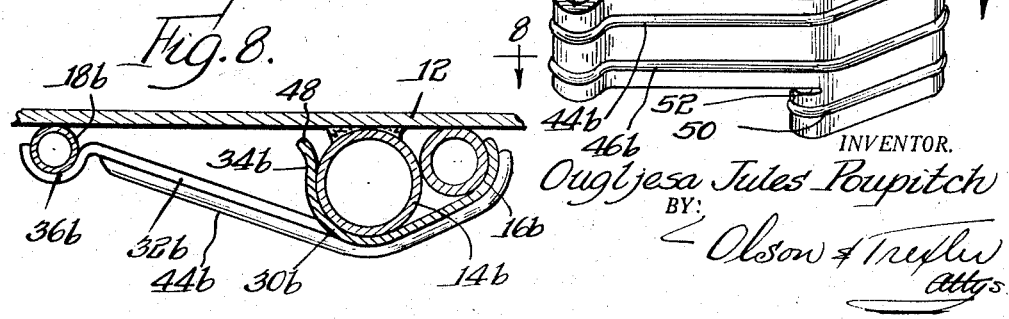
INVENTOR.
Ougljesa Jules Poupitch
BY:
Olson & Trexler
Attys.

United States Patent Office 2,868,486
Patented Jan. 13, 1959

2,868,486

SHEET METAL CLIP

Ougljesa Jules Poupitch, Itasca, Ill., assignor to Illinois Tool Works, Chicago, Ill., a corporation of Illinois Application October 12, 1954, Serial No. 461,815

3 Claims. (Cl. 248—68)

The present invention relates to a novel securing member for retaining a plurality of elongated members and more particularly, to a novel clip for retaining a plurality of conduits, cables or the like, disposed along a panel or support structure.

There are numerous instances wherein it is desired to secure a plurality of adjacently disposed conduits or cables against vibrating or flexing in order to prevent injury thereto. For example, in certain appliances such as refrigerators, a plurality of conduits is provided for directing the fluid refrigerant between the various elements of the refrigerating system. The appliance is sometimes subject to severe shocks or vibrations as during shipping or moving thereof, and it is desirable that the conduits be retained in a secure manner so as to prevent injury thereto, which injury might permit the refrigerant to escape.

It is a primary object of the present invention to provide a novel clip whereby a plurality of conduits or cables may be securely retained in a simple and economical manner.

A more specific object of the present invention is to provide a novel one piece sheet material clip which may be economically manufactured and easily applied to a plurality of conduits, cables or the like.

A further object of the present invention is to provide a novel clip of the above described type which may be used to secure a plurality of cables or conduits having different diameters.

Other objects and advantages of the present invention will become apparent from the following description and accompanying drawings wherein:

Fig. 1 is a fragmentary elevational view showing a structure incorporating the features of the present invention;

Fig. 2 is an enlarged fragmentary perspective view showing an assembly embodying the principles of the present invention;

Fig. 3 is an elevational view showing a novel clip of the present invention;

Fig. 4 is a cross sectional view taken along line 4—4 in Fig. 2;

Fig. 5 is an elevational view of a slightly modified form of the present invention;

Fig. 6 is a perspective view of a clip embodying another modified form of the present invention;

Fig. 7 is an elevational view of the clip shown in Fig. 6; and

Fig. 8 is a cross sectional view similar to Fig. 4 but showing an assembly including the novel clip of Figs. 6 and 7.

Referring now more specifically to the drawings wherein like parts are designated by the same numerals throughout the various figures, an assembly 10 incorporating the features of the present invention is shown in Figs. 1, 2 and 3. This assembly includes a panel or frame member 12 which may be a part of various structures such as a refrigerator. A plurality of substantially parallel conduits 14, 16 and 18 is disposed along the panel 12. These conduits may form a part of various systems and for the purpose of illustrating an application of the present invention, these conduits form a part of a refrigerating system. Preferably, at least one of the conduits is welded or otherwise fixed to the panel 12. As shown best in Figs. 2 and 4, the conduits may have different diameters and preferably, the larger diameter conduit 14 is welded to the panel as indicated at 20. The assembly 10 also includes one or more clips 22 which serve to hold the conduits 16 and 18 securely against the panel.

Each of the clips 22 is formed from a single piece or body 23 of resilient sheet material such as sheet metal. The sheet metal body of each clip is formed so that one marginal end portion 24 thereof is turned or curved laterally for hooking around the conduit 16. An intermediate portion 26 of the body is formed so that it may traverse both of the conduits 14 and 16. As shown best in Figs. 1 and 2, the body is provided with a slit or slot 28 which extends transversely of the end portion 24 and divides the body into arm portions 30 and 32. The arm portion 30 is formed inwardly to extend around the conduit 14 and the marginal end portion 34 thereof is turned inwardly to hook beneath the conduit 14. The arm portion 32 extends outwardly substantially beyond the end of the arm portion 30 for engagement with the conduit 18 which may be spaced considerably from the conduit 14. Preferably, the outer end 36 of the arm portion 32 is curved or hooked in order to confine the conduit 18.

The clip members 22 initially have the cross sectional shape shown in Fig. 3. During assembly of each clip member with the conduits, the inturned end portion 34 is first hooked beneath the conduit 14 and at the same time, the hooked end portion 36 of the arm 32 is positioned over the conduit 18. In order to accomplish this, the resilient arm portion 32 must be flexed outwardly with respect to the panel and the end portion 34 and since, as shown in Fig. 3, the arm 32 initially traverses a plane in which the outer ends of the portions 24 and 34 are disposed, the inherent resiliency of the sheet metal causes the arm 32 to clamp the conduit 18 against the panel in a secure manner. Assembly of the clip is completed by flexing the intermediate portion 26 sufficiently to permit the end portion 24 to be snapped over the conduit 16 as shown best in Fig. 4. This flexing is facilitated by providing the intermediate portion with a transverse looped section 38. However, in order to provide the clip with sufficient strength and rigidity, a pair of parallel ribs or beads 40 and 42 are formed in the intermediate portion 26. These beads substantially start at the looped section 38 and terminate adjacent the inturned section 34. In addition, similar beads or ribs 44 and 46 are formed in the arm portion 32 and extend from points adjacent the marginal end portion 24 to points adjacent the curved or hooked portion 36.

From the description given above, it is seen that the present invention has provided a novel assembly and a novel clip whereby a plurality of conduits or the like may be easily and economically retained in a secure manner so as to prevent undue flexing thereof. More specifically, it is seen that of a plurality of conduits, only one need be welded or otherwise fastened to the support panel while the others are securely retained and clamped against the panel by means of the clips. It is also seen that the clips may be readily applied to a pair of conduits merely by snapping the marginal end portions 24 and 34 around the conduits while a third conduit is easily clamped in position by means of the arm 32. It should be noted that the end portion 24 of each clip completely traverses not only the arm portion 30 but also the arm portion 32 so that twisting of the clip relative to the conduits is prevented.

Fig. 5 discloses a slightly modified form of the novel clip of this invention. This clip is similar to the above described clip 22 as indicated by the application of identical reference numerals with the suffix "a" added to corresponding elements. The clip 22a differs essentially in that the marginal end portion 24a is extended while the opposing inturned marginal end portion 34a is shortened. With this modification, the clip 22a may be applied to the conduits in substantially the same manner as the clip 22 except that the longer end portion 24a is preferably first positioned around the conduit 16 and thereafter the end portion 34a is snapped over the conduit 14.

Figs. 6, 7 and 8 show another embodiment of the present invention wherein the clip is similar to the above described clips as indicated by the application of identical reference numerals with the suffix "b" added to corresponding elements. In this embodiment, the terminal edge 48 of the inturned end portion 34b is flared outwardly to act as a cam for facilitating flexing of the arm portion 30b during assembly of the clip over the conduits 14b and 16b. Another important difference in this clip is that it is provided with a third arm portion 50 at the side of the arm portion 32b opposite from the arm portion 30b. The arm portion 50 is identical to the arm portion 30b and, therefore, need not be described in detail. With this arrangement, it is seen that the arm portions 30b and 50 clip the conduits 14b and 16b at opposite sides of the arm portion 32b so that any tendency of the clip to twist relative to the conduits is completely eliminated. In order to increase the rigidity of the arm portion 32b, the slot or slit 28b and the corresponding slot 52 between the arm portion 32b and the arm portion 50 are formed substantially shorter than the above described slot 28. For maximum strength and rigidity, the slots are formed so that they terminate adjacent the points where the arms 30b and 50 are curved inwardly from their respective intermediate portions. It will be appreciated that, if desired, the slots 28b and 52 may be extended to various points to provide the arm 32b with the desired degree of flexibility.

While the preferred embodiments of the present invention have been shown and described herein, it is obvious that many structural details may be changed without departing from the spirit and scope of the appended claims.

The invention is claimed as follows:

1. A one piece sheet material clip for securing a plurality of conduits or the like disposed in generally parallel relationship along a support structure comprising a body having an intermediate portion for traversing a pair of said conduits or the like and free terminal end portions turned laterally into generally opposed relationship for hooking around said pair of conduits or the like, an integral extension projecting from one side edge of one of said end portions and forming a continuation thereof, and a resilient arm integral with said extension and extending generally along said body and beyond the other of said end portions for retaining a third conduit or the like, said other marginal end portion extending for projecting partially beneath its associated conduit when the clip is fully applied to the conduits.

2. A one piece sheet material clip, as defined in claim 1, which includes another arm extending from said one end portion extension and disposed at a side of said resilient arm oppositely from said one end portion, said third arm having an inturned free hook-like terminal end portion opposed to said one end portion for hooking around said second conduit or the like.

3. A one piece sheet material clip, as defined in claim 1, wherein said intermediate body portion is provided with a looped section disposed between said end portions for facilitating application of said end portions around said pair of conduits or the like, said resilient arm extending so as to traverse a plane in which outermost parts of said end portions are disposed so that during application of the clip to the conduits or the like, said arm is flexed to resiliently clamp said third conduit or the like against said support structure, and said resilient arm having a hooked end portion for retaining said third conduit or the like.

References Cited in the file of this patent

UNITED STATES PATENTS

| | | |
|---|---|---|
| 1,308,869 | Rohmer | July 8, 1919 |
| 1,873,881 | Hall | Aug. 23, 1932 |
| 2,560,486 | Shears | July 10, 1951 |
| 2,729,412 | Amesbury | Jan. 3, 1956 |